(12) United States Patent
Grundy et al.

(10) Patent No.: US 7,181,729 B2
(45) Date of Patent: Feb. 20, 2007

(54) METHODS AND SYSTEMS FOR AN INTERACTIVE THEOREM-PROVING TOOL WITH REFLECTIVE CAPABILITIES

(75) Inventors: James D. Grundy, Hillsboro, OR (US); Mark D. Aagaard, Waterloo (CA)

(73) Assignee: Intel Corporation, Santa Clara, CA (US)

( * ) Notice: Subject to any disclaimer, the term of this patent is extended or adjusted under 35 U.S.C. 154(b) by 541 days.

(21) Appl. No.: 10/335,071

(22) Filed: Dec. 30, 2002

(65) Prior Publication Data

US 2004/0128649 A1    Jul. 1, 2004

(51) Int. Cl.
*G06F 9/44* (2006.01)

(52) U.S. Cl. .................................. 717/128; 717/131

(58) Field of Classification Search ........ 717/106–113, 717/117, 124–128, 131–133
See application file for complete search history.

(56) References Cited

U.S. PATENT DOCUMENTS 5,596,682 A * 1/1997 Yamazaki ..................... 706/56
6,343,372 B1 * 1/2002 Felty et al. ................... 717/136

OTHER PUBLICATIONS

Caldwell et al., "Representing Nuprl Proof Objects in ACL2: toward a Proof Checker for Nuprl", Third International Workshop on ACL2-2002, pp. 1-19, Apr. 2002.*

PRL Group, "Implementing Mathematics with the Nurpl Proof Development System", Computer Science Department, Cornell University, NY, pp. i-v, 1-299, 1995.*

Aagaard, Mark D., et al., "Lifted-FL: A Pragmatic Implementation of Combined Model Checking and Theorem Proving", *Theorem Proving in Higher Order Logics, edited by Y. Bertot et al.*, Springer-Verglag, (Jul. 1999), 323-340.

Constable, R. L., et al., *Implementing Mathematics with the Nuprl Proof Development System*, Prentice-Hall, Inc., Englewood Cliffs, NJ, Computer Science Department, Cornell University, (1986), pp. 1-16, 67-113, and 206-215.

Patterson, D A., "A Case For Redundant Arrays Of Inexpensive Disks (RAID)", *University of California at Berkeley, Report No. UCB/CSD 87/391*, (Sep. 1988).

Taha, Walid, et al., "Multi-Stage Programming with Explicit Annotations", *Partial Evaluation and Semantic Based Program Manipulations: Proceedings of the ACM-SIGPLAN Symposium, PEPM'97*, (1997), 203-217.

* cited by examiner

*Primary Examiner*—Ted T. Vo
(74) *Attorney, Agent, or Firm*—Schwegman, Lundberg, Woessner & Kluth, P.A.

(57) ABSTRACT

Methods and systems are provided for improved operation of a theorem-proving tool. Logic statements that are to be proved are loaded and a series of interactive commands and assumptions are interactively processed. As the series of commands and assumptions are processed they are tracked. Moreover, the series of commands and assumptions are automatically replayed when a change is received. In some embodiments, the commands are validated for correct syntaxes and data types before the commands are processed.

20 Claims, 3 Drawing Sheets

METHODS AND SYSTEMS FOR AN INTERACTIVE THEOREM-PROVING TOOL WITH REFLECTIVE CAPABILITIES

TECHNICAL FIELD

Embodiments of the present invention relate generally to theorem proof tools, and more particularly to methods and systems for an interactive theorem-proving tool having reflective capabilities.

BACKGROUND INFORMATION

Proving the correct operation of hardware, software, or firmware in an electronic environment is a daunting task. This is so, because any particular set of logic statements can have many sub logical branches where problems can potentially occur. With systems that are not critical, validation typically occurs by running test data through the systems and evaluating the results. However, this is not an optimal solution since no matter how robust the test data is there will be some data types/values that are not accounted for and some of the systems' logical statements that will not be processed with the test data. Moreover, in many circumstances, systems are validated before any actual working module has been fully developed. In these instances, pseudo code, designs, functional specifications, or mathematical models need to be used before proceeding to an implementation phase and test data will generally not be particularly useful.

Accordingly, systems that are critical (e.g., microprocessing systems, military systems, communication systems, financial systems, transportation systems, medical systems, and others) are often validated before implementation has been completed or started. These critical systems are often proved through the use of theorem-proving tools. With theorem-proving tools, operators seek to mathematically validate the correct operation of logical models for their systems.

Generally, theorem-proving tools are interactive and permit operators to load and test critical logic with assumptions made about the type of data passed to the logic. For example, one assumption might be that a division calculation must always be checked to ensure that a denominator value is non-zero before performing a division.

Yet, conventional theorem-proving tools are difficult to use by operators. This is so, because existing theorem-proving tools do not have integrated reflective capabilities. That is, existing theorem-proving tools rely on separate interfaces to track a proofing process for any needed replay. Conventional theorem-proving tools do not have the capability to generate data that is itself executable logic, which can be replayed within the theorem-proving tools. Thus, conventional theorem-proving tools lack integrated reflective capabilities.

Without reflective capabilities, operators are forced to learn additional interfaces associated with conventional theorem-proving tools in order to replay a proofing session when a change is needed. Moreover, processing of proof replay is inefficient and problem detection difficult, since a third-party application is providing the replay capability, which is not integrated with the tools.

Furthermore, existing theorem-proving tools generally lack the capability to validate syntaxes and data types used by the logic statements being proofed. As a result, only the statements are proofed, yet syntax checking and data typing remain critical aspects of a proof as well, and these are not generally addressed with existing tools.

Therefore, there is a need for improved implementations of theorem-proving tools. These implementations and techniques should be theorem-proving tools that have integrated reflective capabilities, and capabilities to validate syntaxes and data types for logic statements being proofed.

DESCRIPTION OF THE EMBODIMENTS

Novel methods and systems for theorem-proving tools are described. In the following detailed description of the embodiments, reference is made to the accompanying drawings, which form a part hereof, and in which is shown by way of illustration, but not limitation, specific embodiments of the invention that may be practiced. These embodiments are described in sufficient detail to enable one of ordinary skill in the art to understand and implement them, and it is to be understood that other embodiments may be utilized and that structural, logical, and electrical changes may be made without departing from the spirit and scope of the present disclosure. The following detailed description is, therefore, not to be taken in a limiting sense, and the scope of the embodiments of the inventions disclosed herein is defined only by the appended claims.

Figure 1:
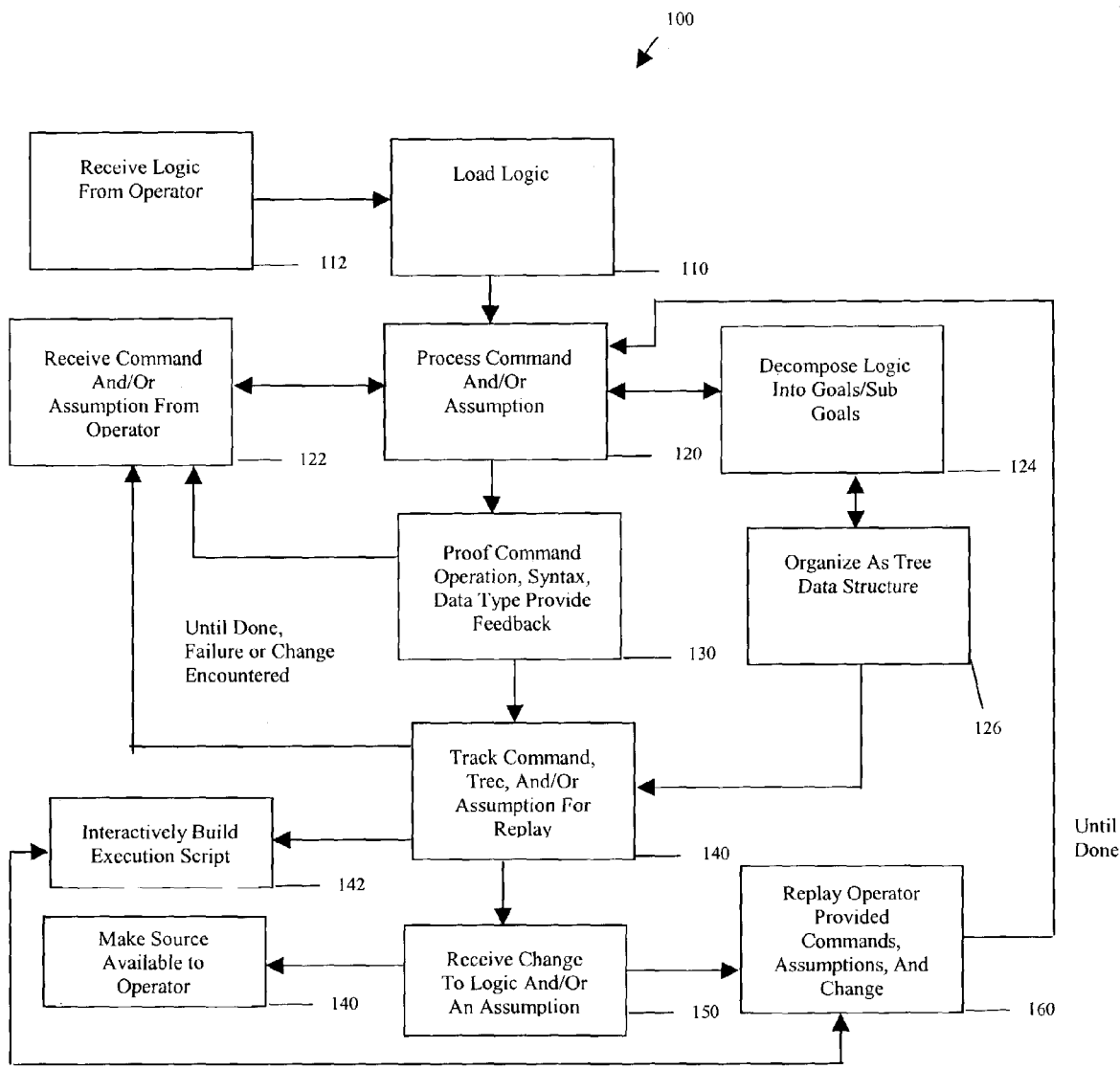
FIG. 1 is a flow diagram of a method to prove logic statements, in accordance with one embodiment of the invention.

FIG. 1 illustrates a flow diagram of one method 100 to prove logic statements, in accordance with one embodiment of the invention. The method 100 is implemented as a theorem-proving tool processing in an electronic environment. The theorem-proving tool can utilize any logic of computable functions (LCF) architecture, or any other logic process, which enables the tool to mathematically evaluate the logic statements for purposes of proving the operational goals of the logic statements. Moreover, in some embodiments, the theorem-proving tool is goal oriented, such that goals being achieved by the logic statements can be decomposed and evaluated as a series of one or more goals with sub goals. The goals and sub goals represent sub processing logic included within the logic statements being proofed.

The theorem-proving tool can operate on any physical machine including a personal computer (PC), mainframe, handheld device, portable computer, set-top box, intelligent appliance, or any other computing system or device. Furthermore, the theorem-proving tool is interactive and capable of processing individual sub logic statements within a block of logic statements. The theorem-proving tool is implemented in an interpretative and typed programming language. In this way, syntax checking and data typing is implicitly provided with the theorem-proving tool, since this is the nature of the programming language used to implement the theorem-proving tool. Moreover, the theorem-proving tool operates on logic statements embodied as source code for a software application, or any other form of formal logical statements that can appear in designs, functions specifications, or mathematical models.

Moreover, the theorem-proving tool is designed to accept assumptions about logic statements being proofed. These assumptions, in some embodiments, represent certain limitations associated with data being processed by the logic statements and/or certain limitations with respect to results and/or operation of sub logic within the logic statements. For example, some sub logic may expect to receive data for processing that falls within a certain range or is of a certain type (e.g., values greater than 0, values representing integer data types, and the like). The theorem-proving tool is designed to permit assumptions to be provided before proofing logic statements, which can be provided interactively during a proofing session.

During operation of the theorem-proving tool, an operator interacts with the tool to provide commands and assumptions through an interface recognized by the tool. The interface can be existing interfaces associated with LCF theorem-proving tools or any additional custom-developed interface designed to achieve the various embodiments of the present invention provided herein. In one embodiment, the interface is implemented as a command-line interface. In other embodiments, the interface is implemented as a Graphical User Interface (GUI), Text User Interface (TUI), Disk Operating System (DOS) User Interface (DUI), Unix User Interface (UUI), or the like.

At 110, logic statements to be proofed are identified. An operator, at 112, provides the identity of the logic statements to be proofed through the theorem-proving tool interface. Identification of the statements can be a pointer to a location where the statements reside within an electronic environment (e.g., file, database, and others). Moreover, in some embodiments, the logic statements are embodied as a source code for a software application.

In some embodiments, the operator can also select a set of assumptions that are available as environmental settings or libraries within the theorem-proving tool before the statements are proofed. Thus, unlike previous theorem-proving tools, the operator is capable of reusing and automatically assembling a proofing environment for the statements by selecting existing assumptions recorded within the theorem-proving tool.

Once the statements are loaded and any desired initial assumptions identified, the theorem-proving tool configures itself for operation by beginning stepwise execution of the statements after applying any initial assumptions desired. Next, at 120, the theorem-proving tool is ready to receive commands or any specific assumptions that are associated with proofing the statements. Accordingly, at 122, an operator uses the interface to provide commands and/or assumptions associated with the proof.

In some embodiments, the operator can identify specific sub logic statements and/or areas of the logic statements that are to be proofed first. Moreover, in one embodiment, the operator can request that the all the logic statements be decomposed into goals and sub goals at 124. Goals and sub goals represent specific sub logic included within the statements. For example, if logic statements being proofed were for the purposes of solving a linear equation for X, a top goal is solving the overall linear equation provided as input to the statements, and sub goals may one sub goal associated with sub logic within the module that isolates X to the left side of the equation using addition and subtraction and another sub goal associated with other logic within the module to divide or multiply any constant associated with X. In some embodiments, these goals and sub goals can be organized as a tree, at 126, where the root node is the linear equation to solve with the module being proofed, and children nodes being the sub logic to perform addition/subtraction and division/multiplication. Thus, in order to prove the logic statements, the validity of the two sub goals or children nodes are first proofed and if these sub goals are proved it can be implied that the main goal for the logic statements (e.g., the linear equation solving for X) is also proved.

The above example is presented for purposes of illustration only, it is readily apparent that any particular set of logic statements being proofed can include a plurality of logic (e.g., if-then-else statements and the like) that results in more complex decomposition and tree structure having sub logic at varying levels within the tree. Thus, the embodiments of the present invention are not tied to any particular implementation logic statements being proofed.

Again, at 122, the operator interactively provides command instructions and/or assumptions, related to processing, to the theorem-proving tool. At, 120, the theorem-proving tool interactively processes any received command and/or assumption against the appropriate sub logic associated with the logic statements being proofed. In some embodiments, the commands include syntax and/or data types that are required by the logic statements for proper execution. In these embodiments, if a provided command is in an incorrect format or provides data in an incorrect type, then the theorem-proving tool immediately notifies the operator of the mistake. In this way, the theorem-proving tool validates syntax and data typing before proofing a desired section of sub logic within the logic statements being proofed. As one of ordinary skill in the art appreciates, logic statements need validated not only for execution/operation but also for syntax and data typing. An incorrect syntax can cause a failure during operation, and an incorrect data type can cause a failure or a more difficult problem, such as processing normally but producing unexpected results.

Thus, at 130, each operator provided command operation is proofed for syntax, data type, and correct operation with feedback given to the operator when problems are detected. As assumptions are made, commands are provided, and any tree of goals and sub goals are constructed, the theorem-proving tool tracks, at 140, this information for purposes of potential replay at some later point in time during an operator's proofing session with the theorem-proving tool. This permits the theorem-proving tool to be reflective. That is, the theorem-proving tool capable is capable of self-generating executable statements that can be executed by the theorem-proving tool when requested or needed.

One technique to achieve this can be to record each and every executed statement made by the operator since the beginning of the theorem-proving session as an executable script, at 142, which can be serially processed by the theorem-proving tool when requested to do so. The script can execute in the background and perform other operations such as clearing the current session, initializing a new session, and then serially executing the statements in the script. Thus, when a replay is needed during the proof due to a change or correction made to the logic statements, the operator is not aware that the entire previous session is being reconstructed by the theorem-proving tool in order to place the operator back in a state of the proof that existed before a change was provided by the operator.

As one of ordinary skill in the art readily appreciates, a theorem-proving tool with integrated reflective capabilities provides a significant improvement over conventional theorem-proving tools. With conventional tools when a change is encountered, the operator would be forced to start and/or interface with a separate third-party application in order to affect a replay. In some cases, a problem in the replay operation may occur and the operator will get little assistance with resolving the problem through his/her conventional theorem-proving tool, since the replay is a separately provided interface or tool.

The interactions with the operator and the theorem-proving tool continue until a change is encountered where the operator takes an action and/or makes a new assumption. A change includes changes to the logic statements being proofed or new assumptions being made by the operator. A new assumption can be associated with limitations for data provided to the module (e.g., non-zero values for division calculations, and the like).

Accordingly, during the proofing processes a change is detected with the statements being proofed that require some action. Thus, at 150, the theorem-proving tool receives a change while in a particular proofing state of the proof. In one embodiment, this can prompt the theorem-proving tool to provide the operator with a problem area of the logic statements associated with the problem detected at 140. One technique to achieve this is for the operator to have profile information that is provided to the theorem-proving tool at startup, such that the theorem-proving tool can display the logic statements in the operator's preferred editor.

Once the theorem-proving tool receives the change from the operator, which in some cases can be a new assumption or changed logic statements associated with the problem, at 160, the theorem-proving tool automatically replays for the operator entire prior recorded session along with the change to place the operator in a state of the proof that immediately follows the change. Of course this presupposes, that the change is in fact a not a problem, and if it is a problem, then the operator is placed in a state where the change needs modified before the proof continues. As previously discussed, in one embodiment, the replay occurs by using an interactively built script that tracks the operators' session and can operate in the background unbeknownst to the operator. Thus, from the operator's perspective he/she interactively proofs his/her logic statements making changes along the way until his/her logic statements are successfully proved.

The embodiments of method 100 provide a theorem-proving tool that is capable of reproducing a proofing state automatically. Further, the theorem-proving tool has integrated reflective capabilities that permit the replay. The theorem-proving tool also validates syntax and data types associated with the logic statements, which are significant aspects associated with the successful operation of logic statements.

Figure 2:
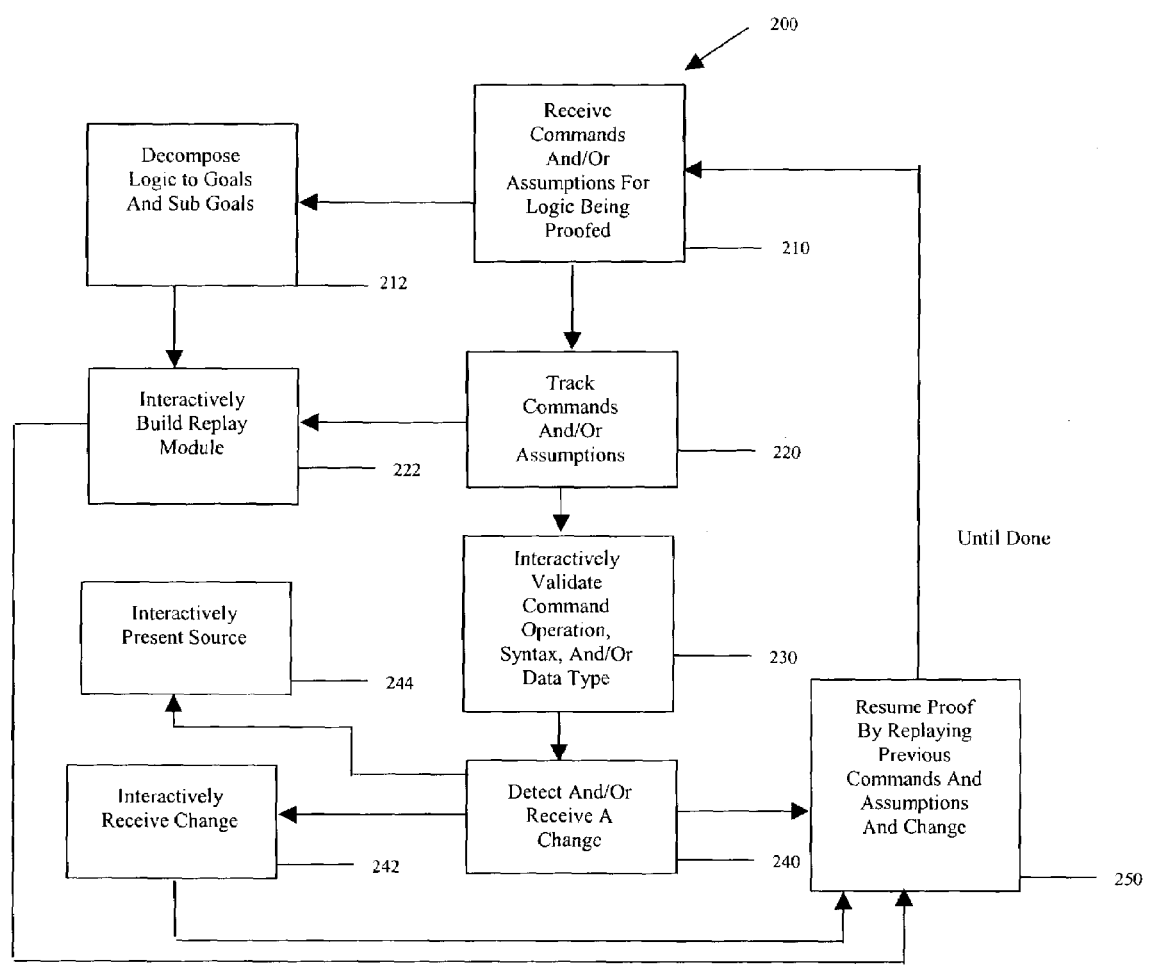
FIG. 2 is a flow diagram of another method to prove logic statements, in accordance with one embodiment of the invention.

FIG. 2 illustrates a flow diagram of another method 200 to prove logic statements, in accordance with one embodiment of the invention. The method is an article having a machine accessible medium with associated instructions. The instructions when executed provide an interactive theorem-proving tool for proving logic statements. The theorem-proving tool has reflective capabilities that permit the tool to generate data that is itself automatically executable by the tool. This reflective nature of the theorem-proving tool permits the theorem-proving tool to reconstruct a proof from any proof state where a failure or problem is detected during the proofing process. The theorem-proving tool is written in an interpretative and typed language such that the generated code that provides a replay capability does not require any compiling and/or linking in order to be executed by the tool. Moreover, since the tool is implemented in a typed language syntax checking and type checking for the logic statements being proofed is implicitly provided by the tool.

The tool can be based on any LCF architecture, or other logic architecture, for proving logic statements. Moreover, existing command line interfaces and/or GUI interfaces can be used to communicate with the tool. The interface interacts with an operator that is proofing logic statements for accuracy. The operator provides commands associated with executing sub logic included within the logic statements being proofed and assumptions about limitations associated with data processed by the logic statements, results processed by the logic statements, and the like.

The tool is particular useful in improving the development time that it takes an operator to prove the accuracy of logic statements for a model representing hardware or software systems. Systems that would particularly benefit from various embodiments of the theorem-proving tool of the present invention include microprocessor systems, military systems, transportation systems, financial systems, communication systems, medical device systems, and the like. Of course one of ordinary skill in the art appreciates that any hardware or software model can be used with various embodiments of the present invention to improve the development time associated with proving the accuracy logic statements. Thus, the various embodiments of the present invention are not intended to be limited to any particular implementation of logic statements being proofed.

Initially, the theorem-proving tool can be configured prior to initial execution. An operator can use the interface to provide the locations of the desired logic statements to be proofed. Moreover, in some embodiments, the commands permit certain profile settings associated with an operator to be communicated to the theorem-proving tool, such as preferred editor for modifying the logic statements, and the like. The theorem-proving tool can also permit an operator to select and load certain available assumptions associated with proving the logic statements, such as data limitations, result limitations, environmental limitations, and the like.

Once an operator has interacted with the theorem-proving tool to provide at least the location of the logic statements to be proofed and optionally information regarding desired profiles, assumptions, the theorem-proving tool configures itself accordingly and loads the logic statements to be proofed. Next, the theorem-proving tool is ready to receive commands and/or assumptions directly related to proofing the loaded logic statements.

Accordingly, at 210, the theorem-proving tool interactively receives commands and/or assumptions associated with proving the accuracy of the logic statements being proofed. In some embodiments, a command permits the entire set of logic statements to be decomposed into a series of goals and sub goals as depicted at 212. The goals and sub goals represent definable sub logic statements that are present in the set of logic statements. In some embodiments, the theorem-proving tool organizes these goals and sub goals as nodes of a tree data structure, where the root node is the goal to prove the accuracy of the entire set of logic statements being proofed. The operator is then free to individually proceed to separately and selectively proof goals and sub goals included within the tree. As the operator validates various goals and sub goals of the tree, a state associated with the overall proofing process progresses.

Furthermore, at 220, as the operator processes commands and/or assumptions the theorem-proving tool records the actions taken by the operator, which has permitted the operator to reach a particular state within the overall proofing process. In one embodiment, the theorem-proving tool achieves this by interactively building a replay module at 222. The theorem-proving tool can directly process the replay module without any outside assistance, third-part application, or interface. In this way, the theorem-proving tool includes integrated reflective capabilities in order to generate executable logic statements, which the theorem-proving module can automatically process when it is determined that it is necessary to do so. The replay module includes previous commands, assumptions, and information about any constructed tree data structure having goals and sub goals associated with the logic statements being proofed.

At 230, the theorem-proving tool interactively validates the operation of any provided command, assumption, syntax associated with a command, and data type associated with a command. Thus, the theorem-proving tool is capable of not only proofing a command's operation, but can also validate syntax and data types associated with parameter data passed with a command. As one of ordinary skill in the art appreciates, this is an improvement over conventional theorem-proving tools, since typically syntax checking and data typing is not available during a proofing process.

At some point in time, at 240, during the proofing process, a proofing state is reached where the theorem-proving tool detects a change. A change can be encountered because a problem is detected such as a data value is it out of range, an execution statement associated with a portion of the logic statements fails or does produce results associated with defined assumptions, and the like. Moreover, a change can be detected when an operator independently decides something (e.g., an assumption or some logic statements) needs modified.

Thus, when a change is detected, the theorem-proving tool waits to receive, at 242, a change from the operator. When a change is a new assumption, the new assumption can be limitations with respect to data processed, limitations with respect to results produced, and others. Again, a change can also be when the operator independently alters or modifies some of the logic statements.

In one embodiment, the theorem-proving tool can also interactively present a source, at 244, associated with a problem logic statement that is detected. The source can be presented to the operator in the operator's preferred editor and can be presented to display the logic statement represented in the source code where the problem occurred.

Accordingly, at 250, once the operator has provided a new assumption, such as an assumption that he/she has fixed a coding problem in the source and the like, the theorem-proving tool automatically processes the proof back to a proof state immediately following the new assumption provided by the operator. If the operator provided an incorrect assumption (e.g., did not properly fix the coding problem or other assumption), then the operator is automatically placed in a proofing state that he/she was originally in before the initial problem was detected.

Thus, with various embodiments of the present invention, an operator can truly interactively proof his/her logic statements and interactively alter a number of the logic statements at the same time. Unlike conventional tools, the operator is not forced to remember to use external application or interfaces in order to have a proof replayed to a desired state in the proofing process. Moreover, the theorem-proving tool validates syntaxes and data types associated with a module being proofed, since the theorem-proofing tool is written in a typed programming language. One of ordinary skill in the art now appreciates how the theorem-proving tool provided with various embodiments of the present invention can significantly reduce the development time associated with proofing logic statements. The logic statements can be source code for a software application, logical models, pseudo code, functional specifications, designs, or other statements written in a standard mathematical manner.

Figure 3:
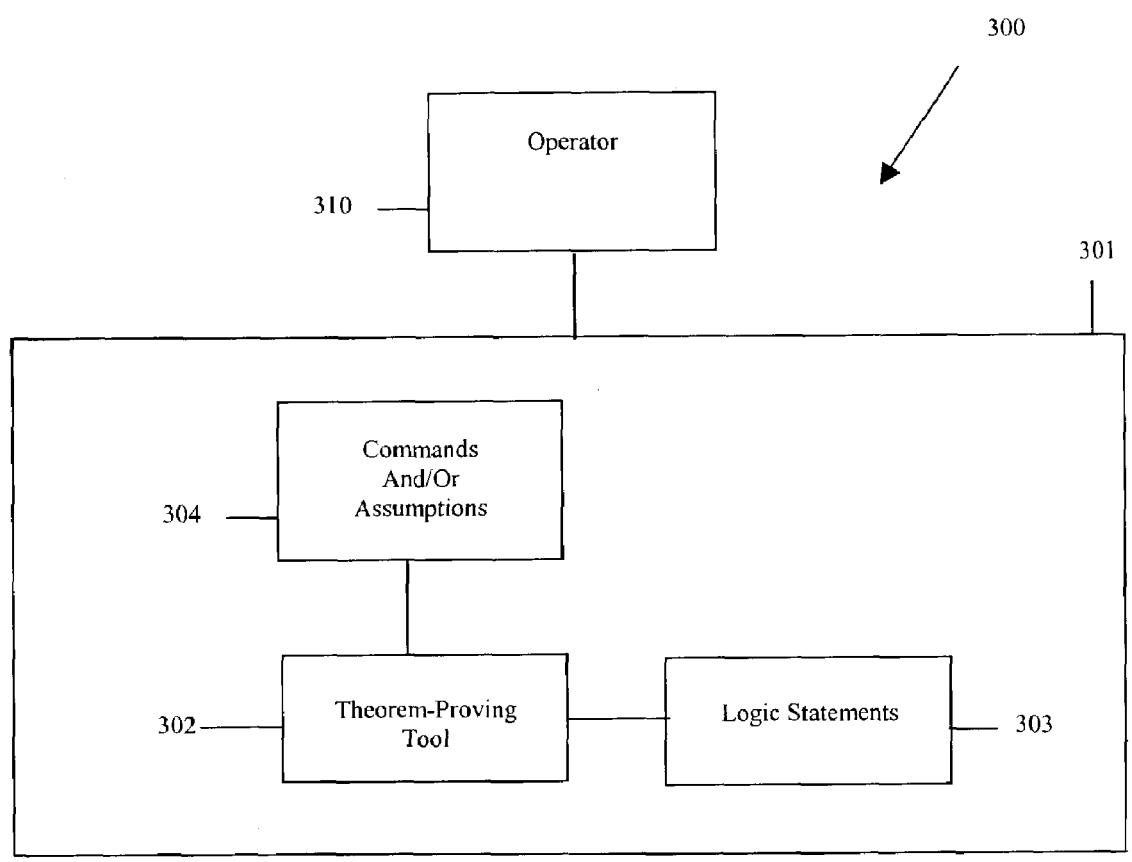
FIG. 3 is a diagram of a theorem-proving system, in accordance with one embodiment of the invention.

FIG. 3 illustrates a diagram of one theorem-proving system 300, in accordance with one embodiment of the invention. The theorem-proving system 300 is operational in a machine-accessible environment 301 having processing, memory, and storage capabilities. The theorem-proving system 300 includes a theorem-proving tool 302 and logic statements 303 that are to be proofed by the theorem-proving tool 302. The theorem-proving tool 302 can be implemented using any LCF architecture, or other logic architecture, and is written in an interpreted language and typed programming language. Thus, theorem-proving tool 302 implicitly provides type checking, such that data types (e.g., integer, character, user-defined, floating point, Boolean, and others) are validated.

The theorem-proving tool 302 includes an interface that permits it to receive commands and/or assumptions 304 regarding the processing and processing environment of the logic statements 303 being proofed. The interface can be command line driven or driven via one or more GUIs. Moreover, the interface can be interfaces associated with existing theorem-proving tools or interfaces custom developed. The interface directly provides replay capabilities during a proofing process, such that no third-party application or separate interface need be used to affect a proof replay. A number of the commands 304 include commands that are recognized by the logic statements 303 for purposes of processing sub logic statements included within the logic statements 303. Further, a number of the commands 304 are specific to the theorem-proving tool 302 and permit the theorem-proving tool 302 to take some desired action. Thus, some commands can include variable names for specific sub logic statements within the logic statements 303 along with any needed data or additional parameters required by the sub logic statements.

Assumptions 304 are another type of command uniquely processed by the theorem-proving tool 302. Assumptions 304 are limitations on data, processing results, or other environmental factors that are to be constrained during the proofing of the logic statements 303. For example, an assumption 304 can assume that any provided data value is greater than 0, or that any result produced by processing a statement of logic is less than 0. In some embodiments, the theorem-proving tool 302 includes commands 304 that permit the automatic inclusion and configuration of sets of pre-defined assumptions 304. In this way, the proofing environment for the theorem-proving tool 302 can be a partially automated and reusable environment with different set of logic statements 303 that may be proofed. Moreover, in some embodiments, the theorem-proving tool 302 includes commands 304 that permit an operator 310 to define profiles associated with the operator 310 (e.g., preferred editor for modifying source code, and the like).

Initially, an operator 310 interfaces with the theorem-proving system 300 for purposes of proofing logic statements 303 associated with hardware and/or software operation. The operator 310 uses the interface to supply commands 304 that initially identifies the logic statements 303. Next, the operator 310 uses the interface to interactively begin to define assumptions 304 associated with the proofing environment.

In one embodiment, the operator 310 uses commands to instruct the theorem-proving tool 302 to decompose the entire logic of the logic statements 303 or pieces of the logic (e.g., subroutines and the like) included within the logic statements 303. In response to these decomposition commands 304, the theorem-proving tool 302 constructs a tree data structure consisting of goals and sub goals. The root node represents the overall processing goal of the desired decomposed logic, and the lower level children nodes represent sub goals associated with sub logic that if proved to be accurate can be used to imply the proof for the root goal.

Next, the operator 310 can select any particular piece of sub logic within the logic statements 303 to prove. Correspondingly, the operator provides commands associated with executing a desired piece of sub logic. When this is done, the execution command 303 will be in a syntax required by the logic being proofed, and if it is not, then the theorem-proving tool 302 immediately validates this is the case and interactively informs the operator 310. Moreover, the operator 310 may supply data types as parameters to an execution command 304. In these embodiments, the theorem-proving tool 302 performs type checking on the supplied data type, and if it does not conform to the strictures of the logic being processed, then the operator 310 is interactively notified of the same.

As the operator 310 is selectively and interactively proofing various pieces of the overall logic associated with the logic statements 303, the operator 310 will be entering an exiting various proofing states associated with the overall proofing process for the execution module 303. The theorem-proving tool 302 tracks each of these states and state transitions and interactively and transparently builds data that is itself capable of being processed directly by the theorem-proving tool 302. Thus, the theorem-proving tool 302 is reflective. That is, capable of generating data that can be automatically processed by the theorem-proving tool as executable statements. This reflective nature is integrated into the theorem-proving tool 302, and is not separate or provided as a separate interface that must be plugged in to the tool 302.

At some point during the proofing process, the operator 310 may enter a proofing state where a change (e.g., processing error, assumption error, operator desire to change something, and the like) is detected. As one of ordinary skill in the art appreciates, this can occur near the end of the proofing process for logic statements 303, such that the operator 310 has already expended a substantial amount of time and energy to reach this particular proofing state. Conventionally, the operator 310 using a conventional theorem-proving tool would require execution of a separate tool or interface to place the operator 310 back in the proper proof state. In various embodiments of the present invention, the operator 310 can make a change and resume the proofing process at a proofing state that immediately follows the state where the problem was detected, without having to access or call a separate tool and/or interface in order to achieve this.

With various embodiments of the present invention, the theorem-proving tool 302 has integrated reflective capabilities. Thus, when a change is detected and made by the operator 310. The theorem-proving tool 302 can replay the entire proofing session of the operator 310 in order to seamlessly and transparently place the operator 310 in the proofing state that immediately follows the proof state in which the change was initially made. This, of course, assumes that the operator 310 did in fact make a change that is not itself a problem. If the operator 310 did introduce a problem with his/her change, then the operator 310 is again placed in the state change can be made to remedy the problem introduced by the operator 310.

Furthermore, in some embodiments, the theorem-proving tool 310 can also automatically provide the operator 310 with a source in a preferred editor of the operator, where the source represents the logic statements 303 being proofed. In this way, the operator 310 can use the theorem-proving tool 302 to more efficiently facilitate an entire proofing, environment. Therefore, an operator 310 more efficiently and timely resolves logic problems and proofs his/her logic statements 303.

It is to be understood that the above description is intended to be illustrative, and not restrictive. Many other embodiments will be apparent to those of skill in the art upon reviewing the above description. The scope of embodiments of the invention should, therefore, be determined with reference to the appended claims, along with the full scope of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of the Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

What is claimed is:

1. A method to prove logical statements, comprising:
   loading the logic statements for a theorem;
   tracking commands and assumptions inputted by an operator associated with processing and proving the logic statements, wherein tracking includes interactively recording, within a proofing session associated with the tracked commands and assumptions, an executable script;
   receiving a change that affects the loaded logic statements from the operator after a number of the commands and assumptions have been processed and before the theorem is completely processed, wherein the change is received during a particular proofing state for the theorem; and
   automatically replaying the commands and the assumptions with the change to place the operator back in the particular proofing state after the change was received and processed, wherein replaying includes processing the executable script.

2. The method of claim 1 further comprising validating syntax associated with the commands before processing the commands.

3. The method of claim 1 further comprising, performing type checking on variables and data associated with the commands before processing the commands.

4. The method of claim 1 further comprising, decomposing the logic statements into a plurality of goals and sub goals associated with proving the software module.

5. The method of claim 4 wherein in decomposing, the goals and sub goals are organized as a tree data structure.

6. The method of claim 1 further comprising, making a source associated with the logic statements available to the operator for modifications associated with the change.

7. The method of claim 1 wherein in tracking, the commands and assumptions are used to interactively build executable statements that are processed with the automatic replaying to reach the state by using reflection.

8. An article having a machine accessible medium having associated instructions, wherein the instructions, when executed, result in a theorem-proving tool comprising at least one component performing:
  replaying a series of previously processed commands and assumptions associated with logic statements of a theorem that are being proved after receiving a change during a proofing session, wherein the replaying occurs while a proof is in process and is in a particular proofing state, and wherein the replaying occurs by processing a script that was interactively recorded during the proofing session up to the particular proofing state; and
  resuming the proofing session of the logic statements at the particular proofing state that represents replaying the series of previously processed commands and assumptions by processing the script, and processing the change.

9. The article of claim 8 further comprising instructions for presenting a source associated with the logic statements for modification when receiving the change.

10. The article of claim 8 further comprising instructions for decomposing the logic statements into a plurality of goals and sub goals representing sub logic of the logic statements, and wherein the series of previously processed commands and assumptions represent processing a number of the goals or sub goals.

11. The article of claim 8 wherein a number of the assumptions represent assumptions about data that is processed by the logic statements.

12. The article of claim 8 further comprising instructions for validating the series of previously processed commands for acceptable syntax and data types recognized by the logic statements.

13. The article of claim 8 wherein the logic statements are associated with at least one logical model used to determine correct operation of a microprocessor system, a transportation system, a financial system, a medical device, a military system, and a communication system.

14. A theorem-proving system, comprising:
  a theorem-proving tool;
  logic statements; and
  wherein the theorem-proving tool loads the logic statements for interactive processing, and wherein the theorem-proving tool interactively tracks and processes commands and assumptions associated with the logic statements by interactively recording an executable script, and wherein the theorem-proving tool automatically replays the commands and assumptions by processing the executable script when a subsequent change is received and while the theorem-proving tool is in process of proving a theorem associated with the logic statements.

15. The theorem-proving system of claim 14 wherein the theorem-proving tool interactively validates syntax, data types, and processing results of the commands.

16. The theorem-proving system of claim 14 wherein the theorem-proving tool makes a source associated with the logic statements available for modification with the subsequent change.

17. The theorem-proving system of claim 14 wherein the theorem-proving tool is implemented in an interpretive and typed software programming language having reflective capabilities.

18. The theorem-proving system of claim 14 wherein the theorem-proving tool constructs a data structure of sub logic statements associated with the logic statements.

19. The theorem-proving system of claim 18 wherein the data structure is represented as a tree with nodes of the tree corresponding to goals and sub goals that represent sub logic statements of the logic statements and that are used to prove the correct operation of the logic statements.

20. The theorem-proving system of claim 14, wherein the commands represent a number of calculations associated with the logic statements and include syntax accepted by the logic statements and data, if necessary, associated with processing the number of the calculations.

* * * * *